(12) United States Patent
Takayama

(10) Patent No.: US 8,291,441 B2
(45) Date of Patent: Oct. 16, 2012

(54) STORAGE DEVICE AND ELECTRONIC EQUIPMENT

(75) Inventor: Akinori Takayama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 218 days.

(21) Appl. No.: 12/696,350

(22) Filed: Jan. 29, 2010

(65) Prior Publication Data

US 2010/0138845 A1 Jun. 3, 2010

Related U.S. Application Data

(63) Continuation of application No. PCT/JP2007/065071, filed on Aug. 1, 2007.

(51) Int. Cl.
*G11B 17/03* (2006.01)
*G11B 33/02* (2006.01)
*G11B 21/08* (2006.01)

(52) U.S. Cl. .................... 720/614; 369/30.92

(58) Field of Classification Search .......... 720/601, 720/614; 369/30.92–30.99
See application file for complete search history.

(56) References Cited

U.S. PATENT DOCUMENTS

| | | | |
|---|---|---|---|
| 4,949,328 A * | 8/1990 | Kase et al. | 720/601 |
| 5,245,602 A * | 9/1993 | Ikedo et al. | 720/614 |
| 5,715,229 A * | 2/1998 | Kim et al. | 369/30.92 |
| 5,867,470 A * | 2/1999 | Kim et al. | 369/30.92 |
| 6,073,762 A | 6/2000 | Hayakawa | |
| 6,310,853 B1 * | 10/2001 | Ito | 720/607 |
| 2004/0124749 A1 * | 7/2004 | Song | 312/9.17 |
| 2007/0033598 A1 * | 2/2007 | Fujisawa | 720/601 |

FOREIGN PATENT DOCUMENTS

| | | |
|---|---|---|
| JP | 59-36001 | 3/1984 |
| JP | 01184753 A * | 7/1989 |
| JP | 9-320162 | 12/1997 |
| JP | 10-302363 | 11/1998 |
| JP | 10-326482 | 12/1998 |
| JP | 2000-99198 | 4/2000 |
| JP | 3095444 | 5/2003 |
| JP | 2006-12340 | 1/2006 |

OTHER PUBLICATIONS

International Preliminary Report on Patentability, mailed Feb. 24, 2010, in corresponding International Application No. PCT/JP2007/065071 (5 pp.).

* cited by examiner

*Primary Examiner* — Daniell L Negron
*Assistant Examiner* — Adam B Dravininkas
(74) *Attorney, Agent, or Firm* — Staas & Halsey LLP

(57) ABSTRACT

A storage device includes a first loading tray to comprise a loading surface on which to abut a non-recording surface of said portable recording medium, a second loading tray to comprise a loading surface, parallel with the loading surface of said first loading tray, on which to abut a recording surface of said portable recording medium loaded in the way of being turned in the same direction as that of the recording surface of said portable recording medium loaded into said first loading tray, and an access unit disposed on the side of the recording surface to access the recording surface of said portable recording medium even in such a case that said portable recording medium is loaded into any one of said first loading tray and said second loading tray.

5 Claims, 15 Drawing Sheets

STORAGE DEVICE AND ELECTRONIC EQUIPMENT

CROSS-REFERENCE TO RELATED APPLICATIONS

This is a continuation of Application PCT/JP2007/065071, filed on Aug. 1, 2007, now pending, the contents of which are herein wholly incorporated by reference.

FIELD

This case relates to technologies of a storage device and electronic equipment.

BACKGROUND

An optical disc drive is known as a drive which performs recording and reproducing (data or information) to and from a CD-ROM and a DVD-ROM. Further, there is spread of a large number of information processing devices such as a personal computer and a variety of players which each incorporate such an optical disc drive. A main type of the conventional optical disc drive is a so-called horizontal type in which the optical disc is placed on a loading tray. Over the recent years, however, a great number of technologies have been proposed, which are capable of using in a state where the loading tray is set vertical, and, as a result, there is also the spread of many optical disc drives taking a so-called stand type and a so-called stand/horizontal combination type.
[Patent document 1] Japanese Patent Laid-Open Publication No. 2006-12340

SUMMARY

According to an aspect of the embodiment, a storage device to execute at least any one of reading and writing data from and to a portable recording medium, including: a first loading tray having a loading surface on which to abut a non-recording surface of the portable recording medium; a second loading tray having a loading surface, parallel with the loading surface of the first loading tray, on which to abut a recording surface of the portable recording medium loaded in the way of being turned in the same direction as that of the recording surface of the portable recording medium loaded into the first loading tray; and an access unit disposed on the side of the recording surface and accessing the recording surface of the portable recording medium even in such a case that the portable recording medium is loaded into any one of the first loading tray and the second loading tray.

The object and advantage of the embodiment will be realized and attained by means of the elements and combinations particularly pointed out in the claims.

It is to be understood that both the foregoing general description and the following detailed description are exemplary and explanatory only and are not restrictive of the invention, as claimed.

DESCRIPTION OF EMBODIMENTS

A storage device of this case will hereinafter be described with reference to the drawings. It may be noted that the storage device of this case can be preferably incorporated into a piece of electronic equipment such as a personal computer and a player. Such being the case, an embodiment, which will hereinafter be described, will exemplify the electronic equipment incorporating an optical disc (corresponding to a storage device according to this case). Configurations in the following embodiments are, however, exemplifications, and This case is not limited to the configurations in the embodiments.

The electronic equipment having a built-in optical disc drive (that will simply be termed a disc drive), which is described in the embodiment, is the electronic equipment used as a so-called a stand type. The electronic equipment in the embodiment includes, in the case of being used as the stand type, a loading surface of the optical disc (corresponding to a portable recording medium according to this case) in a loading tray is always directed to a user when disposed on either the right side or the left side of the user. The electronic equipment in a first embodiment realizes a configuration that the loading surface of the optical disc in the loading tray is invariably directed to the user by having two loading trays of which the loading surfaces have different directions. Further, the electronic equipment in a second embodiment realizes a configuration that the loading surface of the optical disc in the loading tray is always directed to the user by enabling the direction of the loading tray to be changed. Note that the optical disc includes, in addition to a read-only medium such as a CD-ROM and a DVD-ROM, a rewritable medium such as a CD-RW and a DVD-RW. Still further, the optical disc may also be a write-once medium such as a CD-R and a DVD-R.

First Embodiment (Configuration)

Figure 1:
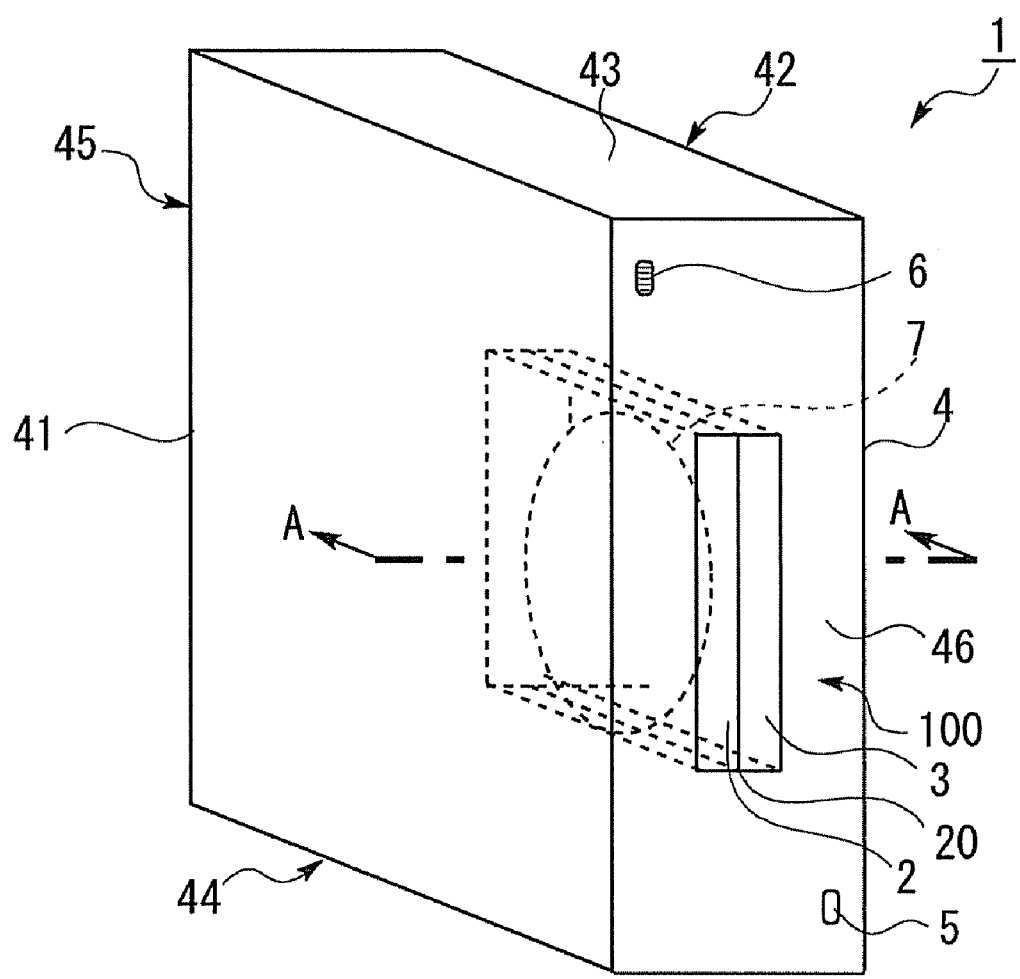
FIG. 1 is a diagram illustrating an outline of a configuration of electronic equipment in a first embodiment.
Figure 2:
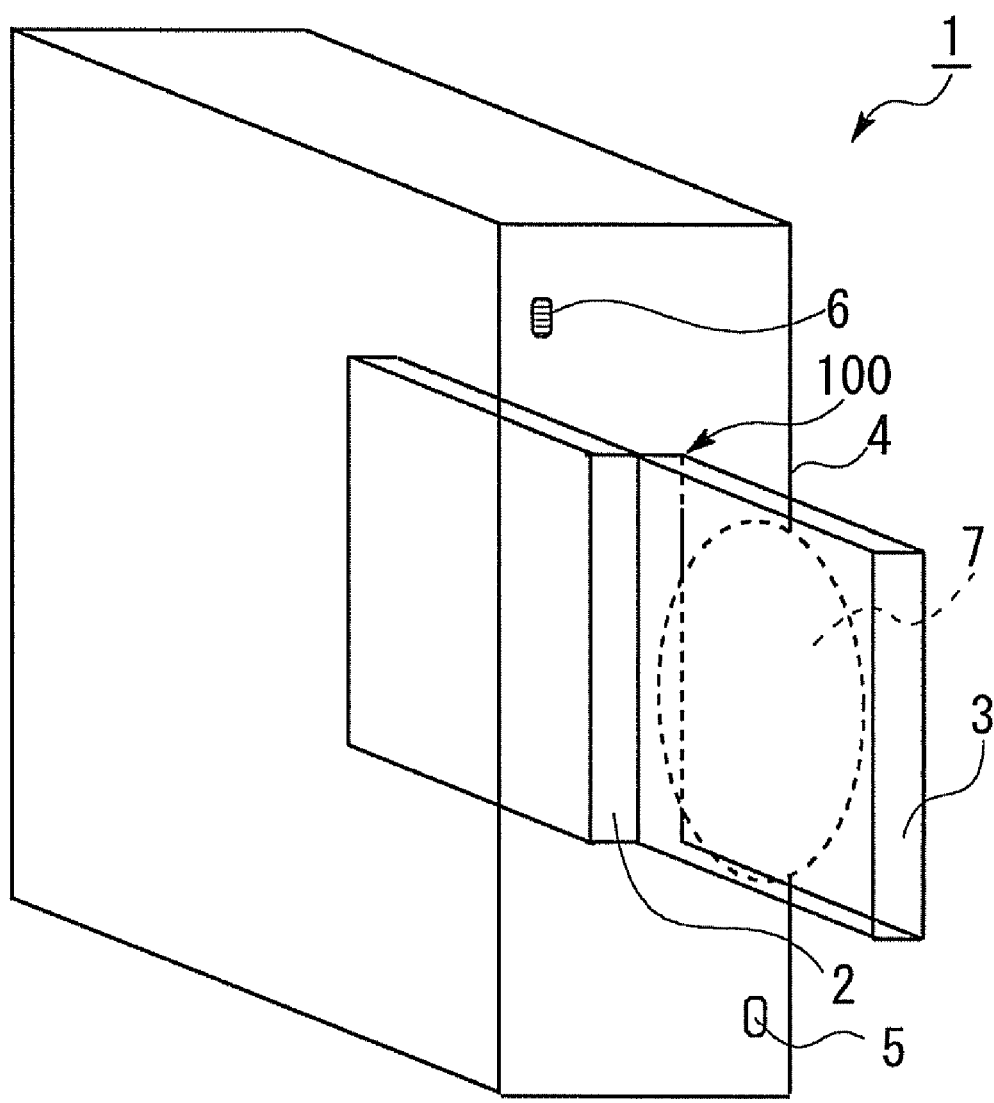
FIG. 2 is a diagram illustrating the electronic equipment in the first embodiment, where a second loading tray is in a non-accommodated state.

FIG. 1 illustrates an outline of a configuration of electronic equipment 1 in the first embodiment, in which a first loading tray 2 and a second loading tray 3 are in an accommodated state. FIG. 2 illustrates an outline of another configuration of electronic equipment 1 in the first embodiment, in which the second loading tray 3 is in a non-accommodated state. FIGS. 1 and 2 each illustrate the electronic equipment 1 in which a built-in disc drive 100 is used in a standing state.

The disc drive 100 in the first embodiment includes the first loading tray 2, the second loading tray 3, a first button 5 which opens and closes the first loading tray 2, and a second button 6 which opens and closes the second loading tray 3. A housing 4 is a housing of the electronic equipment 1, and the disc drive 100 is incorporated into the electronic equipment 1. Note that the electronic equipment 1 is exemplified by an information processing device such as a personal computer and a variety of players for reproducing (data or information) from the optical disc.

The housing 4 houses a variety of devices required by the electronic equipment, such as an unillustrated CPU (Central Processing Unit) and a HDD (Hard Disk Drive) in addition to the disc drive 100. The housing 4 in the first embodiment I includes a first side surface 41, a second side surface 42, a top surface 43, a bottom surface 44, a back surface 45 and a front surface 46. The front surface 46 is formed with an opening 20 (corresponding to an entrance port according to this case) via which the first loading tray 2 and the second loading tray 3 are inserted and ejected. Note that members for forming the respective surfaces can involve using, e.g., synthetic resins (plastics).

The first loading tray 2 and the second loading tray 3 respectively hold optical discs 7 to be loaded. A loading surface 12 for loading the optical disc 7 of the first loading tray 2 and a loading surface 12 for loading the optical disc 7 of the second loading tray 3 are different in their directions. To be specific, the first loading tray 2 is provided with the loading surface 12 enabling the optical disc 7 to be loaded from the right side as viewed on the sheet surface in FIG. 1. On the other hand, the second loading tray 3 is provided with the loading surface 12 enabling the optical disc 7 to be loaded from the left side as viewed on the sheet surface in FIG. 1.

Figure 3:
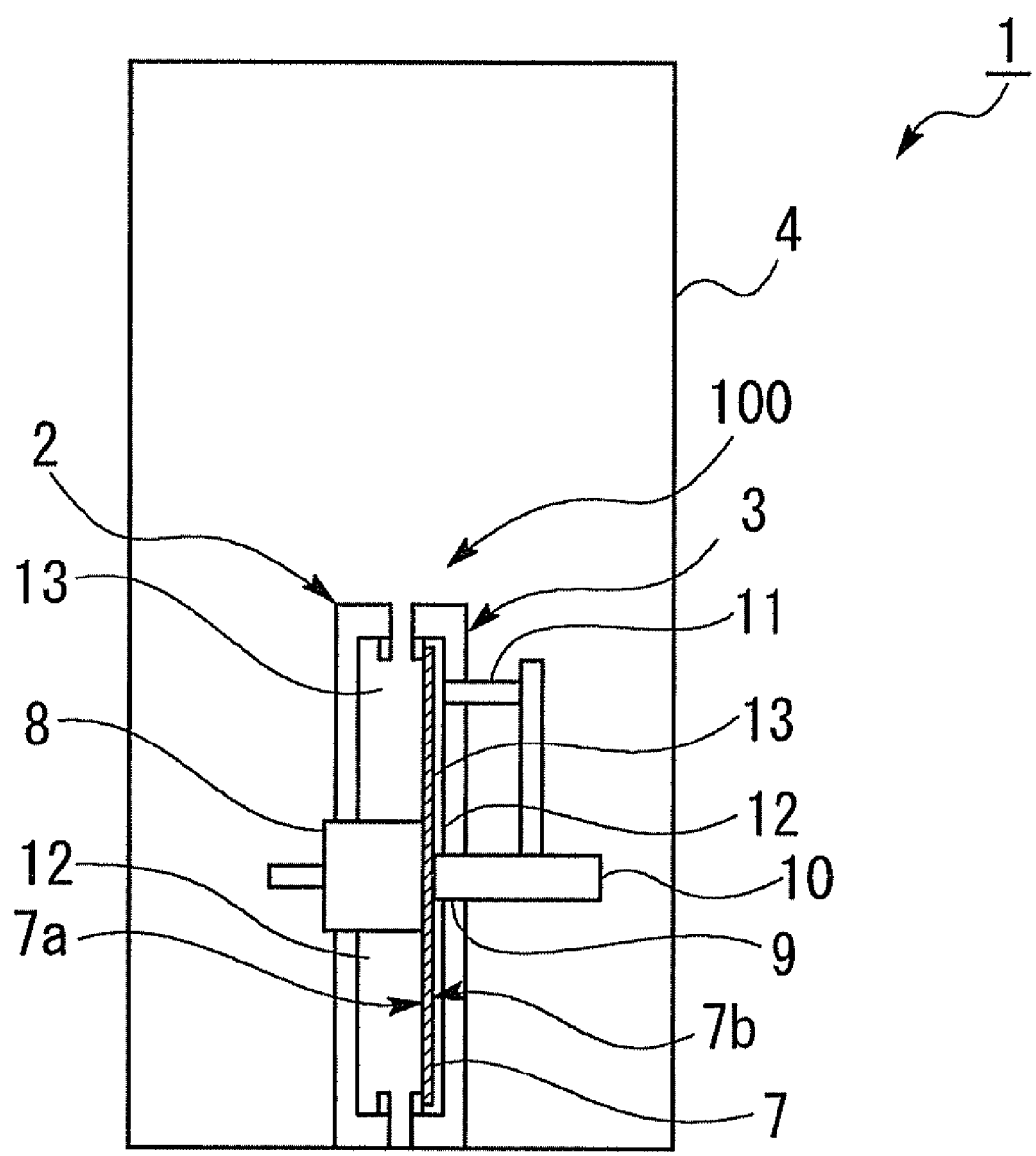
FIG. 3 is a diagram illustrating a state where an optical disc is loaded into the second loading tray
Figure 4:
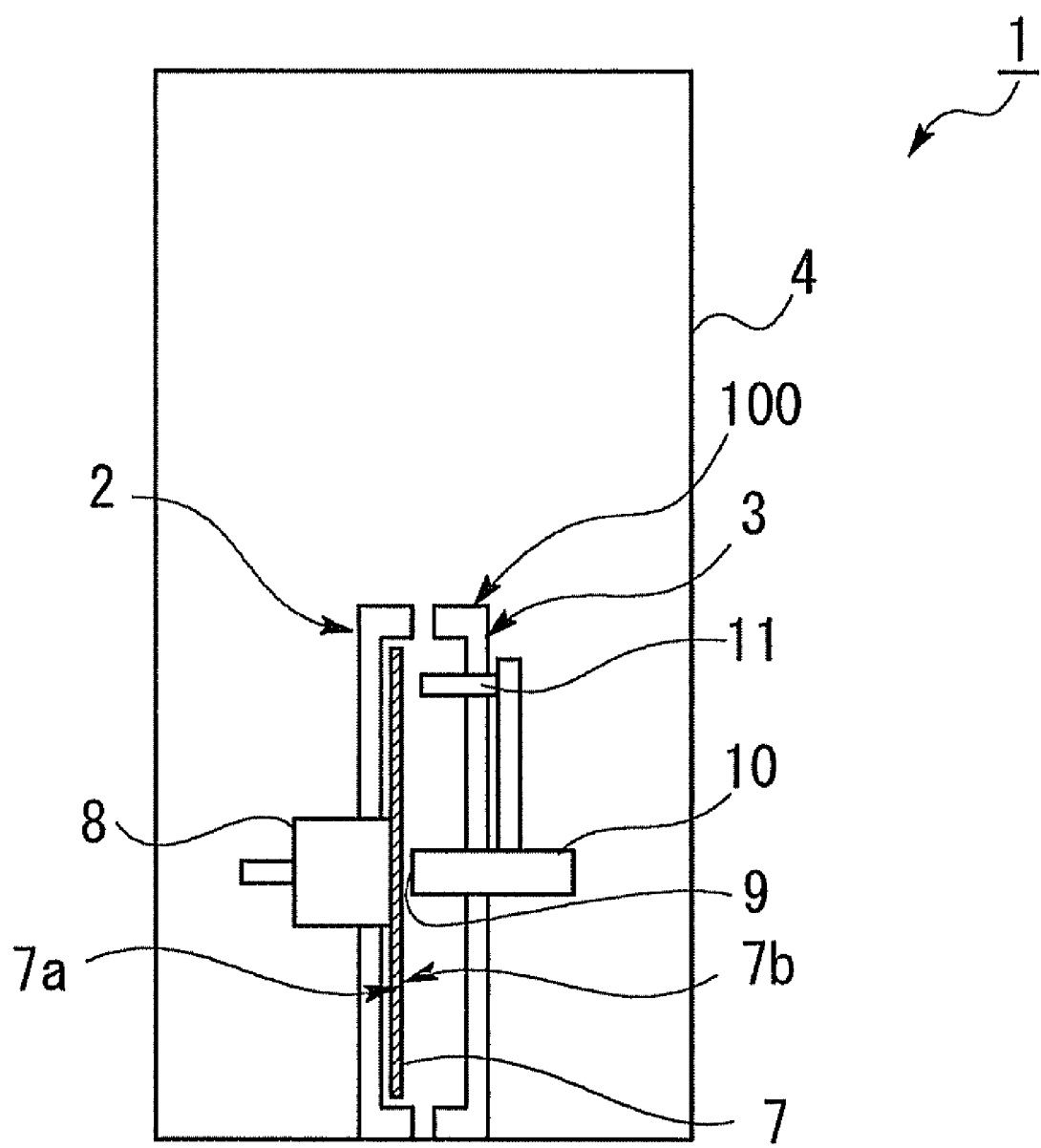
FIG. 4 is a diagram illustrating a state where the optical disc is loaded into a first loading tray.

Herein, FIGS. 3 and 4 each illustrate A-A sections in FIG. 1. FIG. 3 illustrates a state where the optical disc 7 is loaded into the second loading tray 3. FIG. 4 illustrates a state where the optical disc 7 is loaded into the first loading tray 2. The disc drive 100 built in the electronic equipment 1 is provided with the first loading tray 2 positioned on the left side as viewed on the sheet surface and the second loading tray 3 positioned on the right side as viewed on the sheet surface. Further, the disc drive 100 is provided with a clamper 8, a turn table 9, a spindle motor 10 and a pickup unit 11.

The clamper 8 supports the side of a non-recording surface 7a (a non-mirror surface side) of the optical disc 7. More specifically, the clamper 8 supports, on such an occasion that the optical disc 7 is loaded into any one of the first loading tray 2 and the second loading tray 3, the side of the non-recording surface 7a of the loading tray loaded with the optical disc 7. Note that a distance between the clamper 8 and the optical disc 7 changes depending on the loading tray loaded with the optical disc 7. It is therefore preferable that the clamper 8 is movable in a direction orthogonal to the non-recording surface 7a of the loaded optical disc 7. Accordingly, it is preferable that an interior of the housing 4 is provided with, in addition to the configuration described above, a drive unit for driving the clamper 8 in the direction orthogonal to the non-recording surface 7a of the optical disc 7.

The turn table 9 supports the side of a recording surface 7b (a mirror surface side) of the optical disc 7 and also rotates the optical disc 7. Namely, the optical disc 7 is held in the way of being sandwiched in between the clamper 8 and the turn table 9 described above. Then, the turn table 9 rotates, thereby rotating the optical disc 7.

The spindle motor 10 applies a rotational force to the optical disc 7 supported on the turn table 9. Namely, the spindle motor 10 functions as a drive source which rotates the optical disc 7.

The pickup unit 11 emits laser beams to the optical disc 7. More specifically, the pickup unit 11 emits the laser beams to the recording surface 7b of the optical disc 7 and receives the laser beams (reflected beams). Namely, the pickup unit 11 functions as a laser beam source and a light receiving unit as well. Further, the pickup unit 11 emits and receives the laser beams with respect to both of the first loading tray 2 and the second loading tray 3. To be specific, the pickup unit 11 in the first embodiment functions for both of the optical disc 7 loaded into the first loading tray 2 and the optical disc 7 loaded into the second loading tray 3. Hence, it is preferable that the pickup unit 11 is movable in the direction orthogonal to the recording surface 7b of the loaded optical disc 7. Accordingly, it is also preferable that the inferior of the housing 4 is provided with, in addition to the configuration described above, a pickup drive unit for driving the pickup unit 11 in the direction orthogonal to the recording surface 7b of the optical disc 7. It is also preferable for the same reason that the turn table 9 is movable in the direction orthogonal to the recording surface 7b of the loaded optical disc 7 and is therefore provided with a drive source. Note that the pickup unit 11 and the turn table 9 can, it is also preferable, move integrally. This is because, with this contrivance, the turn table 9 and the pickup unit 11 can be moved together by one drive source, and it is feasible to reduce the number of components.

Each of the first loading tray 2 and the second loading tray 3 holds the optical disc 7 to be loaded. Each of the first loading tray 2 and the second loading tray 3 is provided with one loading surface 12. Accordingly, one piece of optical disc 7 can be loaded into one loading tray. Herein, the disc drive 100 in the first embodiment includes the loading surfaces 12 of the first loading tray 2 and the second loading tray 3 are disposed in parallel, but the loading surfaces 12 thereof are differentiated in their directions. Then, the loading surface 12 of the first loading tray 2 is formed to be directed toward the pickup unit 11 (the right side as viewed on the sheet surface), while the loading surface 12 of the second loading tray 3 is formed to be directed toward the clamper 8. This contrivance, according to the electronic equipment 1 in the first embodiment, enables the optical disc 7 to be easily loaded even when disposed on either the right side or the left side of a user 200. Furthermore, the respective loading surfaces 12 disposed in parallel are disposed in parallel with the side surfaces (41, 42) of the housing 4, thereby realizing a space saving scheme in the case of using the electronic equipment 1 in the stand state in the first embodiment.

Next, a further in-depth description of the first loading tray 2 and the second loading tray 3 will be made. It is to be noted that the first loading tray 2 and the second loading tray 3 comprise basically the same configuration. Such being the case, the following discussion will exemplify the second loading tray 3.

Figure 5:
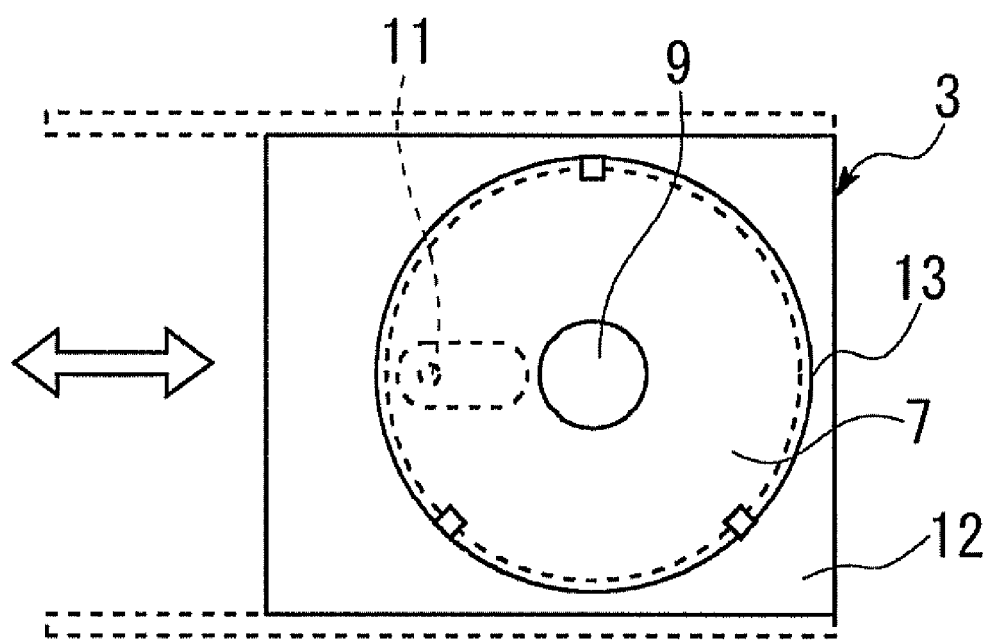
FIG. 5 is a diagram illustrating a loading surface of the second loading tray.

FIG. 5 illustrates the side of the loading surface 12 of the second loading tray 3. The loading surface 12 is formed with a recessed accommodating unit 13 capable of accommodating the optical disc 7. The accommodating unit 13 is formed slightly larger than the optical disc 7 that is circular in its external shape. Further, the accommodating unit 13 is formed deeper than a thickness of the optical disc 7. An edge portion of the accommodating unit 13 is formed with three pieces of pawls 14 for keeping the optical disc 7 in a loaded stated. The pawls 14 are formed at the edge portion of the accommodating unit 13 in order to restrict a motion of the loaded optical disc 7 against the loading direction thereof. Further, the pawls 14 are formed so as to protrude toward the center of the accommodating unit 13 (in other words, toward the center of the optical disc 7).

The first loading tray 2 and the second loading tray 3 are slidable in a horizontal direction. To be specific, the first loading tray 2 and the second loading tray 3 comprise a state of being housed inside of the housing 4 and a state enabling the optical disc 7 protruding outside of the housing 4 to be loaded. Accordingly, it is preferable that the first loading tray 2 and the second loading tray 3 are provided with loading units for sliding the loading trays. A variety of configurations of the loading unit have hitherto been known. For example, the configuration of the loading unit includes a configuration that the loading tray loaded into the interior of the housing is ejected outside by making use of a repulsive force of a spring and a configuration enabling the loading tray to be electrically ejected and loaded in a way that provides a drive source such as a motor and a propagation mechanism such as a gear. Accordingly, the variety of hitherto-known loading units can be applied to the first loading tray 2 and the second loading tray 3 in the first embodiment.

Note that the operation of the loading tray is controlled by the first button 5 or the second button 6. More specifically, the first button 5 opens and closes the first loading tray 2 (see FIG. 1 and FIG. 2). Namely, the first button 5 is pushed, whereby the first loading tray 2 changes to the state of being housed in the interior of the housing 4 and to the state enabling the optical disc 7 to be loaded due to protruding outside the housing 4. Moreover, the second button 6 opens and closes the second loading tray 3. The second button 6 is pushed, whereby the second loading tray 3 changes to the state of being housed in the interior of the housing 4 and to the state enabling the optical disc 7 to be loaded due to protruding outside the housing 4. It may be noted that the electronic equipment 1 in the first embodiment includes that the first button 5 is disposed close to the outside (the right side as viewed on the sheet surface) in the loading direction of the first loading tray 2, while the second button 6 is disposed close to the outside (the left side as viewed on the sheet surface) in the loading direction of the second loading tray 3. To be specific, as depicted in FIG. 1, the first button 5 is disposed close to the outside in the loading direction of the first loading tray 2 as well as being close to the edge of the front surface 46 of the housing 4. On the other hand, the second button 6 is disposed close to the outside in the direction of the underside of the loading surface 12 of the second loading tray 3 but on the diagonal of the first button 5 of the front surface 46 of the housing 4. With this arrangement, in the case of using the electronic equipment 1 as the stand type, the user 200 pushes the button closer to the user himself or herself, whereby the optimal loading tray is opened and closed.

(Using Method)

Next, a method of using the electronic equipment 1 in the first embodiment discussed above will be described. The electronic equipment 1 in the first embodiment includes the two loading trays (the first loading tray 2 and the second loading tray 3) that are differentiated in their loading directions as explained above. Then, the first button 5 can open and close the first loading tray 2, while the second button can open and close the second loading tray 3.

Figure 6:
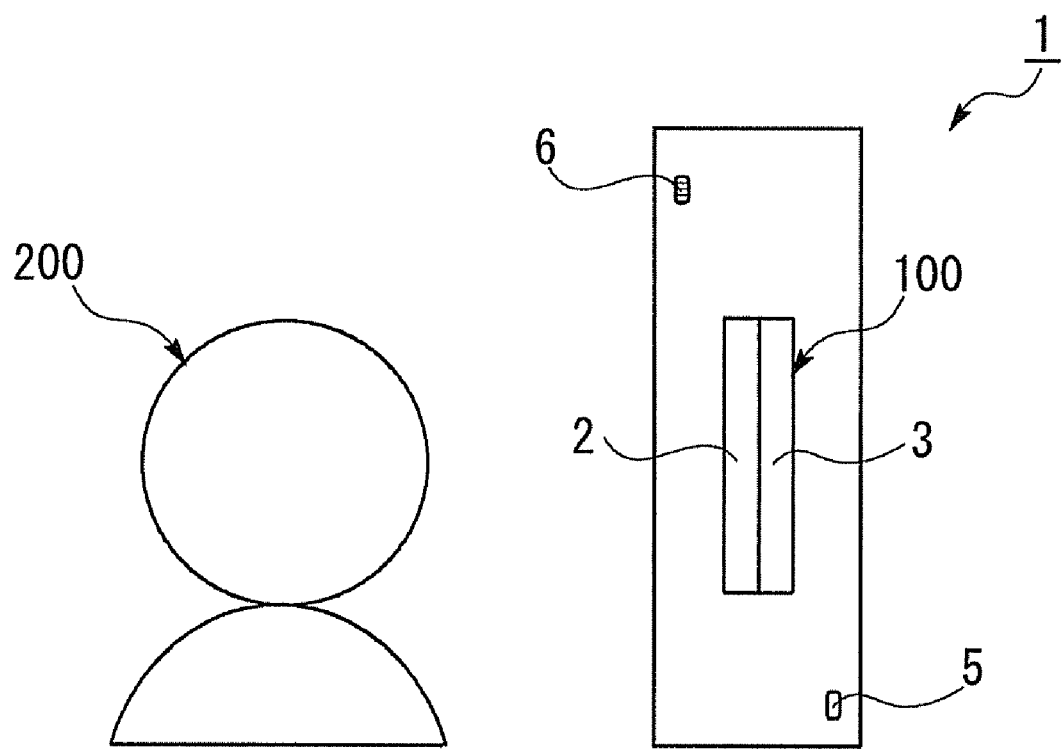
FIG. 6 is a diagram illustrating one example of a case of disposing electronic equipment on the right side of a user.

Herein, FIG. 6 illustrates one example of the case in which the electronic equipment 1 is disposed on the right side of the user 200. In FIG. 6, the electronic equipment 1 is used as the stand type. Then, the electronic equipment 1 is disposed on the right side of the user 200 so that the first loading tray 2 is located close to the user 200. In this case, the user 200 pushes the second button 6 closer to the user 200 himself or herself, whereby the second loading tray 3 can be opened and closed. Note that in the state illustrated in FIG. 6, the loading surface 12 of the second loading tray 3 is directed to the user 200. Hence, the user 200 can easily insert and eject the optical disc into and from the second loading tray 3 opened and closed by manipulating the second button closer to the user 200 himself or herself.

Figure 7:
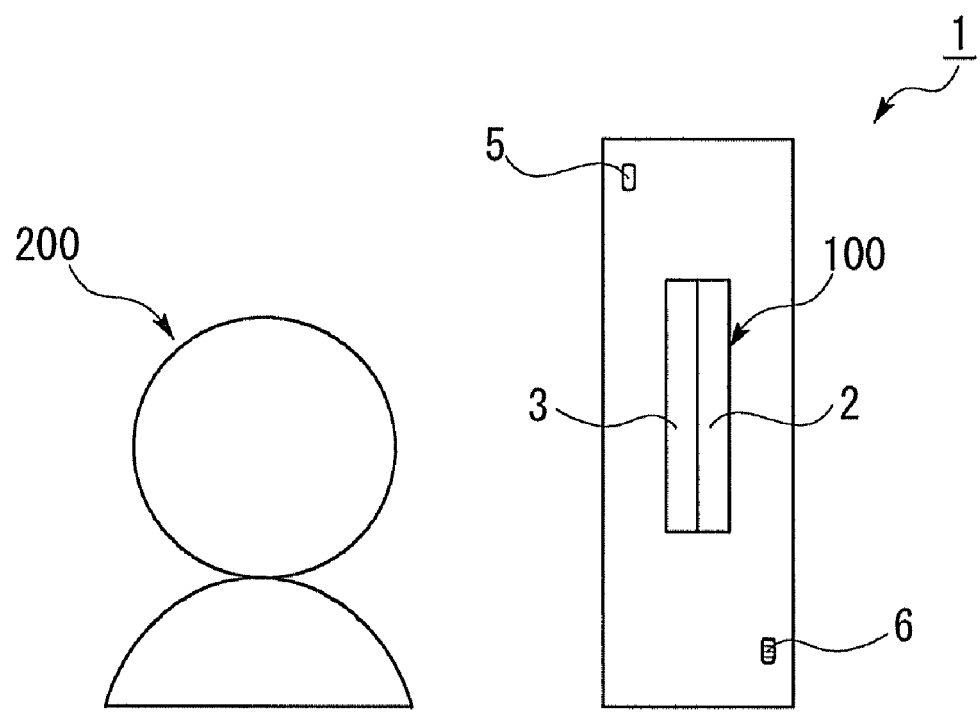
FIG. 7 is a diagram illustrating a layout example where the electronic equipment depicted in FIG. 6 is inverted up and down.

Further, as described above, in the case where the electronic equipment 1 is disposed on the right side of the user 200, the second loading tray 3 may be located on the side of the user 200. FIG. 7 illustrates a layout example in which the electronic equipment 1 illustrated in FIG. 6 is inverted up and down. In the case of this layout, the user 200 pushes the first button 5 closer to the user 200 himself or herself to thereby enable the first loading tray 2 to be opened and closed.

Figure 8:
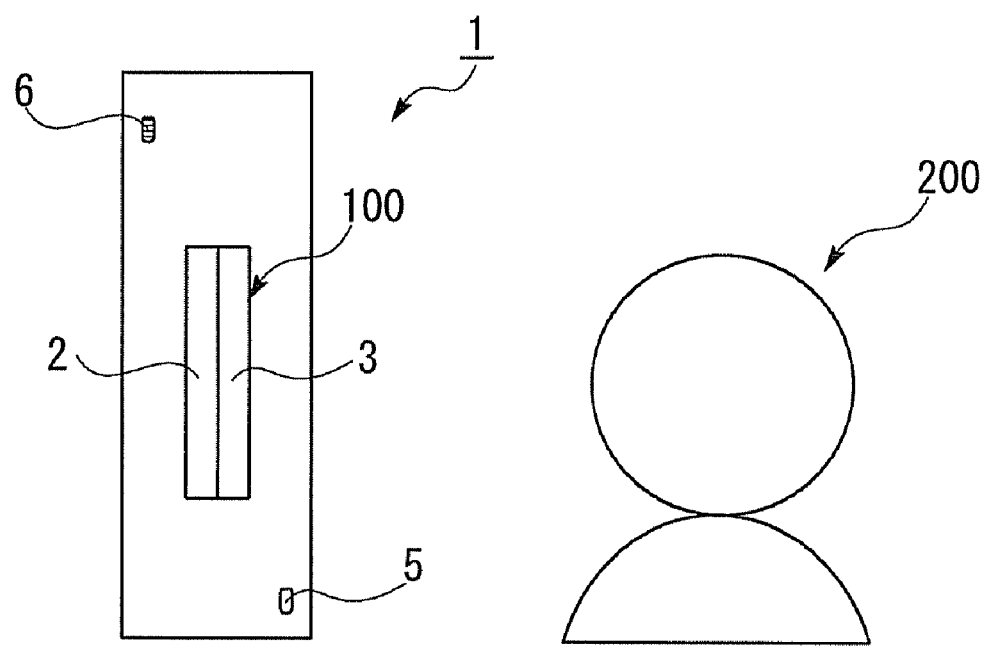
FIG. 8 is a diagram illustrating one example of a case of disposing electronic equipment on the left side of the user.

Moreover, FIG. 8 illustrates one example of the case where the electronic equipment 1 is disposed on the left side of the user 200. In FIG. 8 also, the electronic equipment 1 is used as the stand type. In this case, the user 200 pushes the first button 5 closer to the user 200 himself or herself, whereby the first loading tray 2 can be opened and closed. Note that in the state illustrated in FIG. 8, the loading surface 12 of the first loading tray 2 is directed to the user 200. Therefore, the user 200 can easily insert and eject the optical disc into and from the first loading tray 2 opened and closed by manipulating the first button closer to the user 200 himself or herself. Note that similarly to the case illustrated in FIG. 7, in the case of disposing the electronic equipment 1 on the left side of the user 200, the electronic equipment 1 may be disposed in the way of being inverted up and down.

Thus, the electronic equipment 1 in the first embodiment can be disposed either leftward or rightward of the user 200. Then, the user 200 pushes the button closer to the user 200 himself or herself on whichever side, the left side or the right side, the electronic equipment 1 is disposed, whereby the user 200 can use the loading tray of which the loading surface 12 is directed to the user 200 himself or herself.

Figure 9:
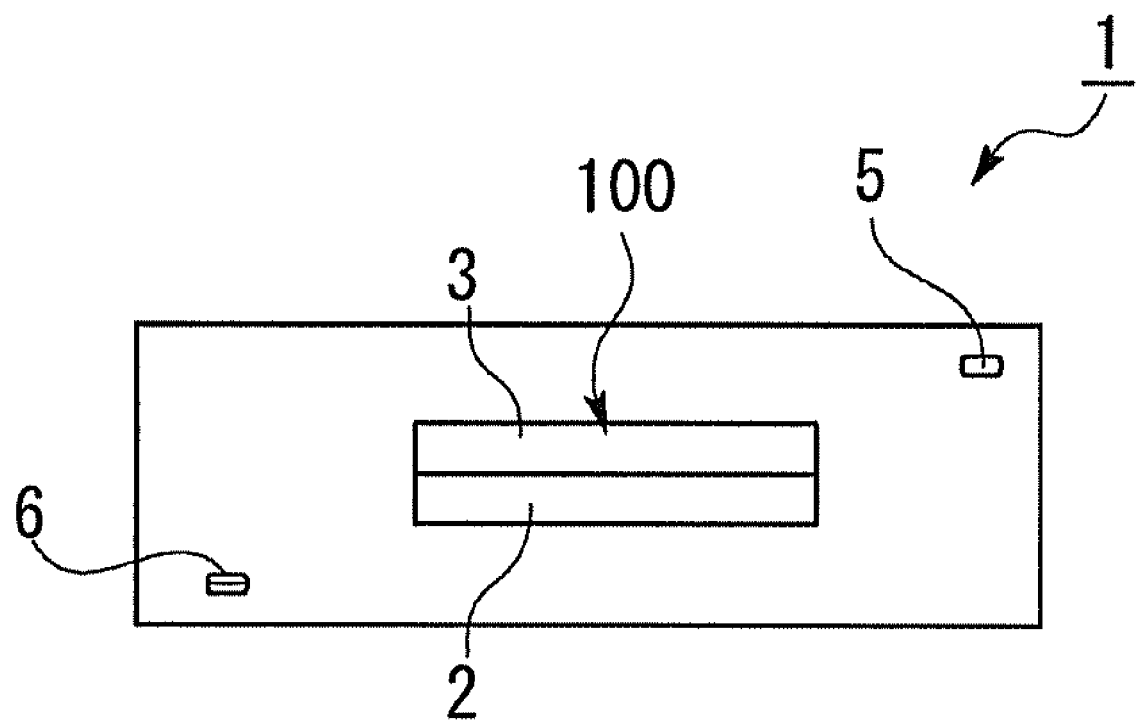
FIG. 9 is a diagram illustrating the electronic equipment in the case of being used as a horizontal type.

Further, the electronic equipment 1 in the first embodiment can be disposed even in a narrow space in the way of being used as the stand type described above. The electronic equipment 1 in the first embodiment may, however, be disposed as a horizontal type. Herein, FIG. 9 illustrates the electronic equipment 1 used as the horizontal type. As depicted in FIG. 9, the electronic equipment 1 in the first embodiment may also be employed as the horizontal type.

The electronic equipment 1 in the first embodiment includes the optical disc drive 100 having the first loading tray 2 and the second loading tray 3 of which the loading surfaces 12 are differentiated in their directions, thereby enabling the optical disc 7 to be easily inserted and ejected even by disposing the electronic equipment 1 either leftward or rightward of the user 200. Further, the electronic equipment 1 in the first embodiment has one pickup unit 11 etc similarly to the conventional disc drive. Accordingly, the electronic equipment 1 in the first embodiment exhibits excellent effects as described above with the small number of components. Yet further, in the electronic equipment 1 in the first embodiment, the buttons (the first button 5, the second button 6) for controlling the operations of the respective loading trays are provided in the predetermined positions. As a result, in the case of using the electronic equipment 1 as the stand type, the user 200 can use the loading tray of which the loading surface 12 is directed to the user 200 himself or herself simply by pushing the button closer to the user.

Second Embodiment

Figure 10:
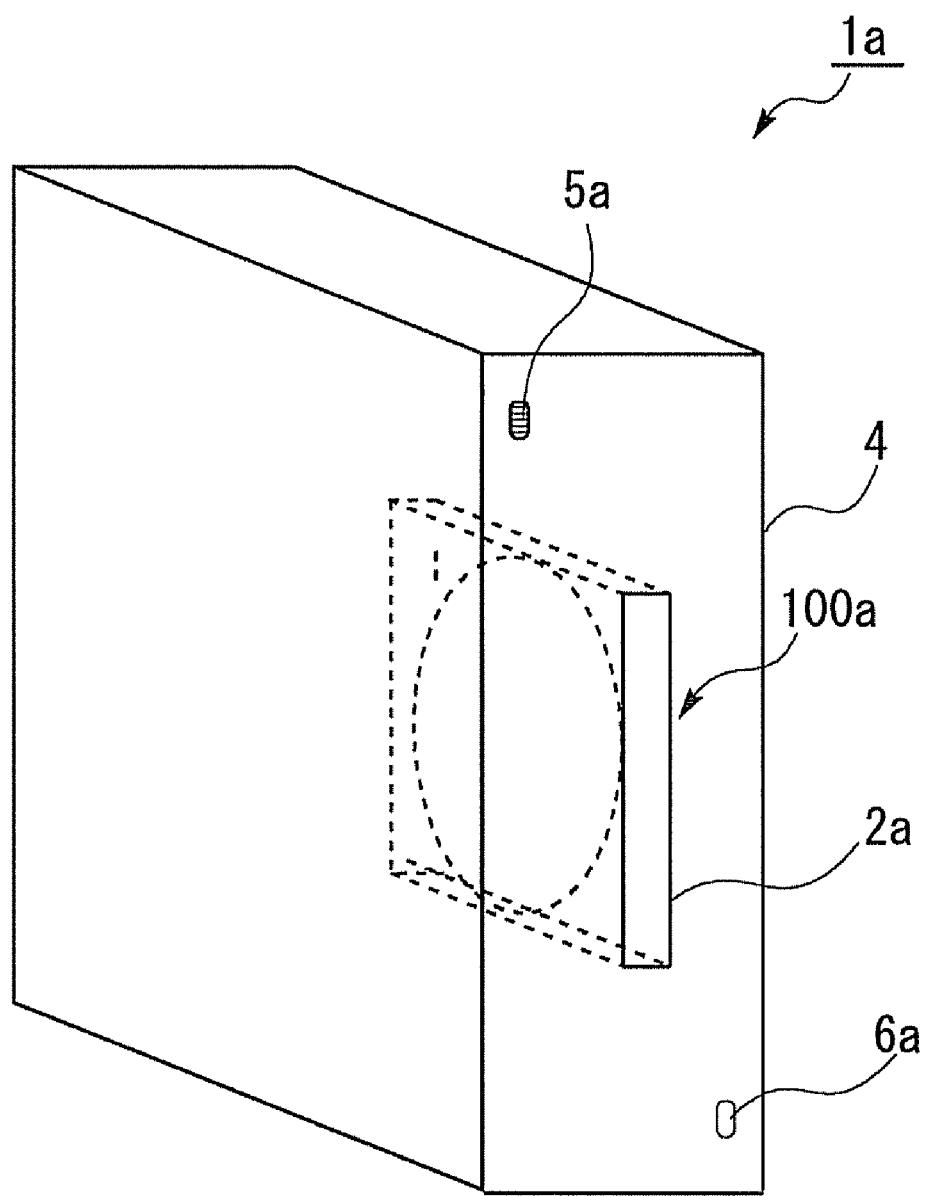
FIG. 10 is a diagram illustrating an outline of a configuration of the electronic equipment in a second embodiment.

Next, electronic equipment is in a second embodiment will hereinafter be described. The electronic equipment is has a built-in disc drive 100a. Then, the disc drive 100a in the second embodiment is different in terms of including one loading tray 2a from the disc drive 100 including the two loading trays described above in the first embodiment. FIG. 10 illustrates the electronic equipment is in the second embodiment. It may be noted that two pieces of buttons 5a, 6a are also provided in the second embodiment. A design is, however, such that one loading tray 2a is provided, and hence the loading tray 2a is opened and closed by pushing any one of the two buttons 5a, 6a. The electronic equipment is in the second embodiment includes that the loading surface of the single loading tray 2a can be changed in its direction. With this contrivance, the electronic equipment is in the second embodiment, similarly to the electronic equipment 1 including the two loading trays differentiated in their loading directions in the first embodiment, enables the optical disc to be easily inserted and ejected even by disposing the loading tray 2a either leftward or rightward of the user 200.

Figure 11:
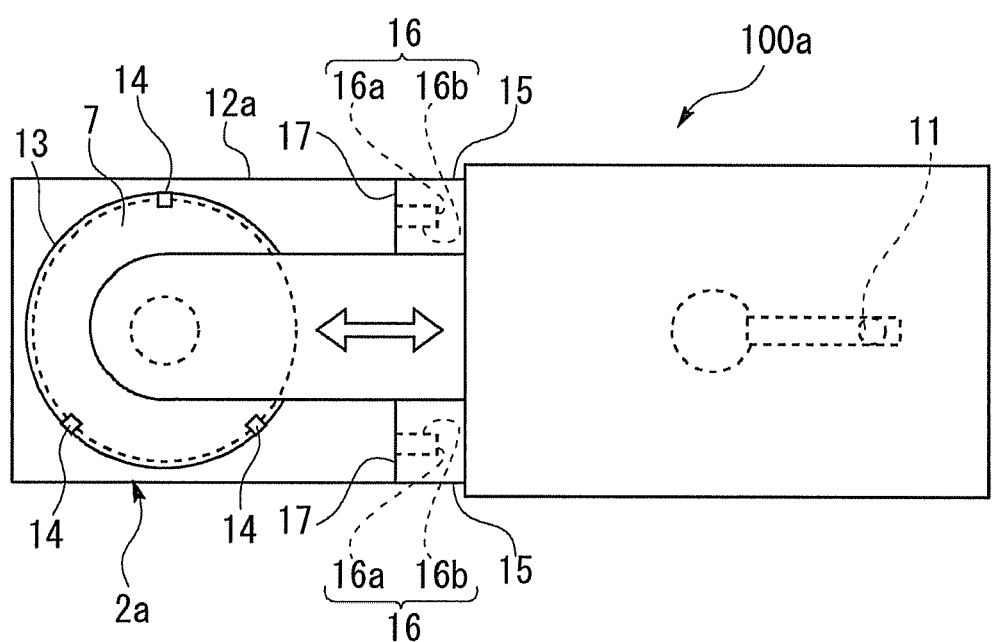
FIG. 11 is a diagram illustrating an upper surface of a loading tray in the second embodiment.
Figure 12:
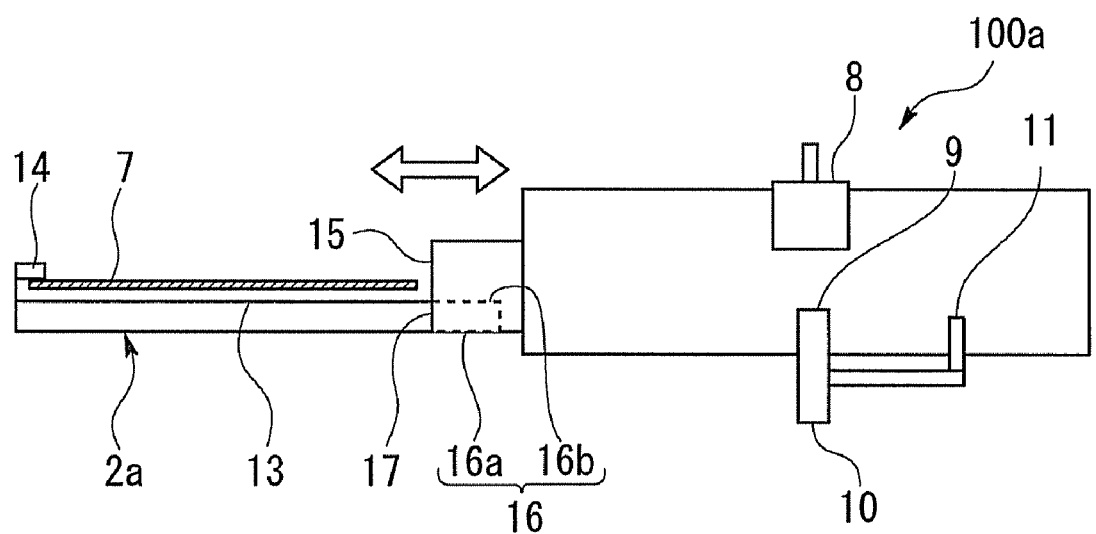
FIG. 12 is a diagram illustrating a side surface of the loading tray in the second embodiment.

Herein, FIG. 11 illustrates a top surface of the loading tray 2a in the second embodiment. Further, FIG. 12 illustrates a side surface of the loading tray 2a in the second embodiment. The disc drive 100a in the second embodiment includes the loading tray 2a, a loading tray support unit 15 and a connecting unit 16. It may be noted that the same components as those in the first embodiment are marked with the same symbols and numerals to thereby omit their detailed descriptions.

The loading tray 2a retains the optical disc 7 to be loaded. The loading tray 2a is, similarly to the first loading tray 2 in the first embodiment, formed with one loading surface 12a. Then, the loading surface 12a is formed with the recessed accommodating unit 13 capable of accommodating the optical disc 7. Further, the edge portion of the accommodating unit 13 is formed with the pawls 14 for keeping the optical disc 7 in the loaded stated. Note that the loading tray 2a is formed with a protruded portion 16a for connecting with the loading tray 2a at a proximal portion 17. This protruded portion 16a connects (engages) with a recessed portion 16b formed in the loading tray support unit 15, thereby enabling the loading tray 2a to connect with the loading tray support unit 15. It may be noted that the protruded portion 16a and the recessed portion 16b configure the connecting unit 16.

Figure 13:
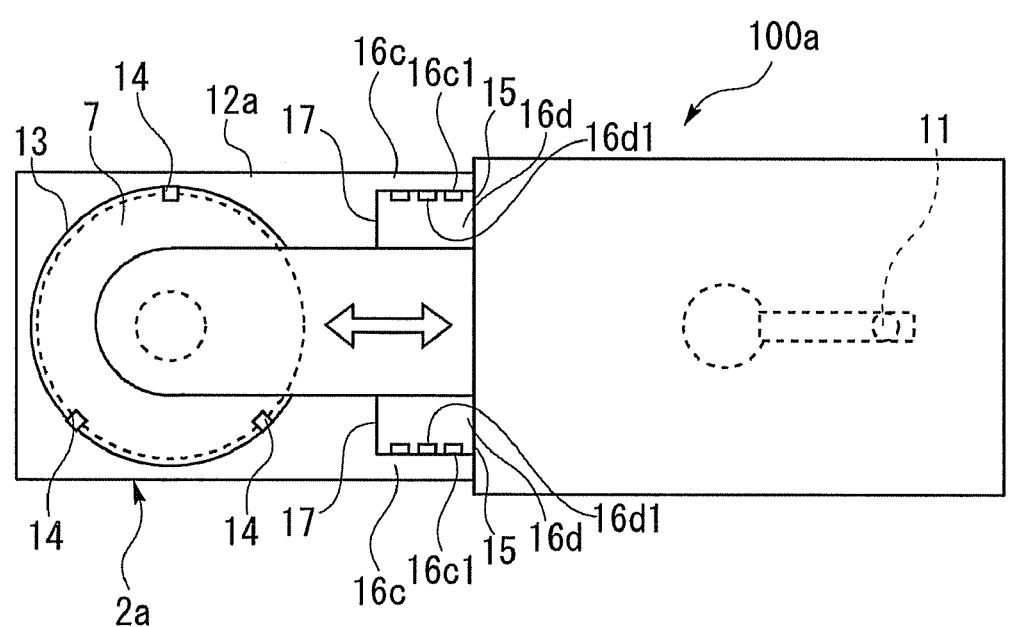
FIG. 13 is a diagram illustrating the upper surface of the loading tray in another embodiment.
Figure 14:
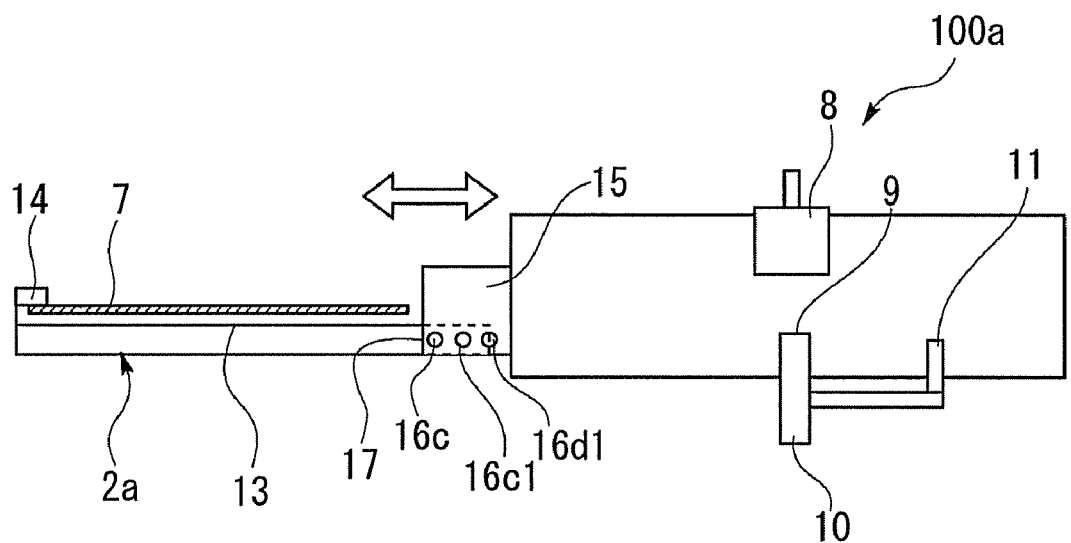
FIG. 14 is a diagram illustrating the upper surface of the loading tray in still another embodiment.

FIG. 13 illustrates a top surface of the loading tray in another embodiment. Moreover, FIG. 14 illustrates a side surface of the loading tray in another embodiment. As illustrated in FIGS. 13 and 14, in this embodiment, the proximal portion 17 of the loading tray 2a is formed with a connecting edge 16c, and a side surface of this connecting edge 16c is formed with a protruded portion 16c1 protruding inside. The loading tray support unit 15 is formed with a connecting target edge 16d connectable to the connecting edge 16c, and this connecting target edge 16d is formed with a connection hole 16d1 connectable to the protruded portion 16c1. More stable connection can be established by having the connecting portion such as this.

Note that in the disc drive 100a also in the second embodiment, it is sufficient to dispose one pickup unit 11 etc. The electronic equipment 1a in the second embodiment is provided with the clamper 8, the turn table 9, the spindle motor 10 and the pickup unit 11 in addition to the loading tray 2a.

(Using Method)

Figure 15:
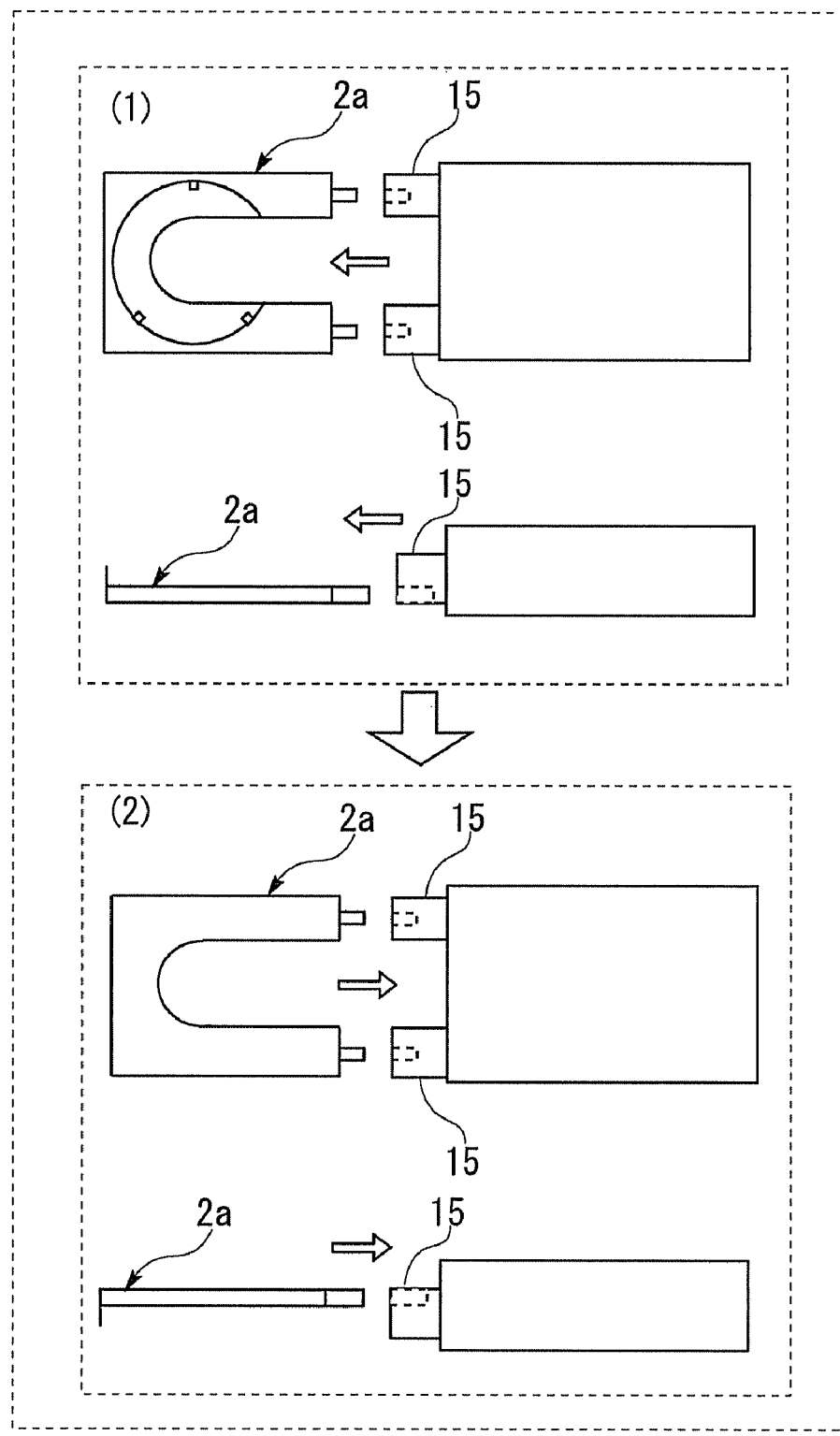
FIG. 15 is a diagram illustrating a state of switching over the loading tray.

A method of using the electronic equipment 1a in the second embodiment discussed above will be described. The electronic equipment 1a in the second embodiment is disposed for the user 200 of the electronic equipment 1a and used in a way that changes the loading surface 12 of the loading tray 2a. Herein, FIG. 15 illustrates a switching state of the loading tray 2a. As illustrated in FIG. 15, to start with, (1) the loading tray 2a is removed from the loading tray support unit 15. Then, (2) the loading tray 2a is inverted and again connected to the loading tray support unit 15. Through the operation described above, the direction of the loading surface 12 of the loading tray 2a can be properly switched over. It may be noted that the disc drive 100a in the second embodiment is provided with one pickup unit 11. Hence, even in the case of switching over the direction of the loading surface 12 of the loading tray 2a, the optical disc 7 is required to be loaded so that the recording surface 7b of the optical disc 7 is directed to the pickup unit 11.

The electronic equipment 1a in the second embodiment includes the disc drive 100a having the loading tray 2a enabled to switch over the direction of the loading surface 12, whereby the optical disc 7 can be easily inserted and ejected on whichever side, the left side or the right side of the user 200, the electronic equipment 1 is disposed. Further, the electronic equipment 1a in the second embodiment includes one loading tray 2a and can be therefore downsized to a greater degree than the electronic equipment 1 in the first embodiment.

<Others>

An optical disc drive is known as a drive which performs recording and reproducing (data or information) to and from a CD-ROM and a DVD-ROM. Further, there is spread of a large number of information processing devices such as a personal computer and a variety of players which each incorporate such an optical disc drive. A main type of the conventional optical disc drive is a so-called horizontal type in which the optical disc is placed on a loading tray. Over the recent years, however, a great number of technologies have been proposed, which are capable of using in a state where the loading tray is set vertical, and, as a result, there is also the spread of many optical disc drives taking a so-called stand type and a so-called stand/horizontal combination type.

The optical disc drive of the stand type can save more of space than by the optical disc drive of the horizontal type. Further, designability can be improved by setting the stand type. The optical disc drive of the conventional stand type, however, takes a configuration that the optical disc is disposed on one side surface of the loading tray disposed vertically. Accordingly, the optical disc must be loaded into the loading tray in a state of being unable to visually check one side surface on which the optical disc is disposed, depending on how the optical disc drive is disposed with respect to a user. Namely, the conventional optical disc drive has a user-unfriendly problem.

Such being the case, for example, a technology disclosed in Patent document 1 is known for solving the problem such as this. The technology disclosed in Patent document 1 is that the optical disc drive is provided with a first loader unit holding a lower portion of the optical disc and a second loader unit holding an upper portion of the optical disc, and each loader unit is provided an optical disc holding portion taking substantially a C-shape in section. The technology disclosed in Patent document 1 enables the optical disc to be visually checked even when the optical disc drive is placed in any positions for the user by holding the optical disc with rod-like loaders provided up and down. As a result, according to the technology disclosed in Patent document 1, the optical disc can be easily inserted and ejected.

According to the optical disc drive of the stand type, more of the space can be saved than by the optical disc drive of the horizontal type. In the optical disc drive of the conventional stand type using the loading tray, however, the side surface of the loading tray into which the optical disc is loaded is predetermined. Hence, the optical disc drive of the conventional stand type has the user-unfriendly problem such as the optical disc being disabled from being visually checked when loaded depending on where the optical disc drive is disposed for the user.

What is proposed for solving this problem is a technology related to the optical disc drive in which the upper portion and lower portion of the optical disc are held by two pieces of rod-like loaders provided up and down. This technology, however, intends to hold the optical disc by the two rod-like loaders. As a result, it is a matter of concern that stability of the holding state of how the optical disc is held is inferior to the optical disc drive adopting the loading tray. Further, the two rod-like loaders comprise a structure that only one ends of the two loaders are fixed, while the other ends are unfixed, and hence such a problem arises that strength is inferior to the optical disc drive using a flat loading tray. Incidentally, the problems described above are, it can be said, applied to the whole of the storage devices in which the data is read and written to a portable recording medium.

It is an object of This case to provide a technology capable of easily inserting and ejecting a portable recording medium irrespective of where a storage device is disposed for a user with respect to the storage device including a loading tray.

This case adopts the following means in order to solve the problems given above. Namely, This case is a storage device executing at least any one of reading and writing data from and to a portable recording medium, including: a first loading tray having a loading surface on which to abut a non-recording surface of the portable recording medium; a second loading tray having a loading surface, parallel with the loading surface of the first loading tray, on which to abut a recording surface of the portable recording medium loaded in the way of being turned in the same direction as that of the recording surface of the portable recording medium loaded into the first loading tray; and an access unit disposed on the side of the recording surface and accessing the recording surface of the portable recording medium even in such a case that the portable recording medium is loaded into any one of the first loading tray and the second loading tray.

According to This case, the loading tray for use can be changed depending on a state of where the storage device is disposed for the user. Namely, the user can select and use the loading tray of which the loading surface is directed to the user himself or herself in the two loading trays. Hence, according to This case, the portable recording medium can be easily inserted and ejected irrespective of where the storage device is disposed for the user.

It may be noted that in the storage device according to This case, the first loading tray and the second loading tray can be used in the vertical state. Accordingly, the storage device of this case can be used as a so-called stand type device where the loading tray is set in the vertical state. The storage device of This case can be also used as a so-called horizontal type device in which the loading tray can be employed in a horizontal state.

This case provides the loading trays of which the loading surfaces are differentiated, in other words, the loading trays having a difference between the directions of inserting and ejecting the portable recording medium. Therefore, the access units corresponding to the respective loading trays may be provided. If the access units are provided corresponding to the respective loading trays, however, such a concern arises that the number of components of the storage device increases and the device itself is upsized. Such being the case, a contrivance of This case is to unify the direction of the recording surface of the portable recording medium loaded into the respective loading trays. This contrivance enables the data to be read from the portable recording medium disposed in each of the two loading trays owing to one access unit.

Herein, the storage device according to this case may further include, in addition to the components described above, a first button controlling an operation of the first loading tray, and a second button controlling an operation of the second loading tray. According to This case, a desire-for-using loading tray can be easily opened and closed by having the button for each loading tray.

Further, in This case, the first button and the second button may be formed on a front surface of the storage device having an entrance port for the first loading tray and the second loading tray, the first button may be disposed close outwardly in a loading direction of the first loading tray, and the second button may be disposed close outwardly in the loading direction of the second loading tray. With this contrivance, any one of the buttons is interposed between the user and the loading tray in the case of using the storage device according to This case as the stand type. Then, the user can select the optimal loading tray by pushing the button closer to the user himself or herself.

It may be noted that in This case described above, the portable recording medium may be an optical disc, and the access unit may be a pickup unit emitting laser beams to the recording surface of the optical disc.

Still further, This case can be configured as electronic equipment having a built-in storage device described above. Namely, This case is the electronic equipment including the storage device described above and a processing circuit issuing, to the storage device, a command to execute at least any one of writing and reading data to and from the portable recording medium. The electronic equipment includes an information processing device such as a so-called personal computer and a player reproducing (data or information) from the portable recording medium. According to This case, it is feasible to provide a technology capable of easily inserting and ejecting the portable recording medium irrespective of where to be disposed for the user with respect to the electronic equipment having the built-in storage device described above.

Yet further, This case may be a storage device executing at least any one of writing and reading data to and from a portable recording medium, including: a loading tray having a loading surface for loading the portable recording medium; a loading tray support unit, to which the loading tray is connected, supporting the loading tray; and a connecting unit connecting the loading tray support unit to the loading tray in an attachable/detachable manner and enabling the loading tray support unit to connect with the loading tray even in a state where the loading surface of the loading tray is inverted.

According to This case, one loading tray can be used by inverting the tray by having the configuration described above. As a result, the portable recording medium can be easily inserted and ejected irrespective of where the storage device is disposed for the user. It may be noted that the portable recording medium may be an optical disc. Moreover, This case may be electronic equipment including the storage device described above, and a processing circuit issuing, to the storage device, a command to execute at least any one of writing and reading data to and from the portable recording medium.

According to This case, the portable recording medium can be easily inserted and ejected irrespective of where the storage device is disposed for the user with respect to the storage device having the loading trays.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it may be understood that the various changes, substitutions, and alterations could be made hereto without departing from the spirit and scope of the invention.

What is claimed is:

1. A storage device to execute at least any one of reading and writing data from and to a portable recording medium, comprising:
    a first loading tray to comprise a loading surface on which to abut a non-recording surface of said portable recording medium;
    a second loading tray to comprise a loading surface, parallel with the loading surface of said first loading tray, on which to abut a recording surface of said portable recording medium loaded in the way of being turned in the same direction as that of the recording surface of said portable recording medium loaded into said first loading tray; and
    an access unit disposed on the side of the recording surface to access the recording surface of said portable recording medium even in such a case that said portable recording medium is loaded into any one of said first loading tray and said second loading tray,
    wherein the loading surface of the first loading tray and the loading surface of the second loading tray are different in their loading directions.

2. The storage device according to claim 1, further comprising:
    a first button to control an operation of said first loading tray; and
    a second button to control an operation of said second loading tray.

3. The storage device according to claim 2, wherein said first button and said second button are formed on a front surface of said storage device having an entrance port for said first loading tray and said second loading tray,
    said first button is disposed close outwardly in a loading direction of said first loading tray, and
    said second button is disposed close outwardly in the loading direction of said second loading tray.

4. The storage device according to claim 1, wherein said portable recording medium is an optical disc, and
    said access unit is a pickup unit emitting laser beams to the recording surface of said optical disc.

5. Electronic equipment comprising:
    a storage device to execute at least any one of reading and writing data from and to a portable recording medium, the storage device including:
    a first loading tray to comprise a loading surface on which to abut a non-recording surface of said portable recording medium,
    a second loading tray to comprise a loading surface, parallel with the loading surface of said first loading tray, on which to abut a recording surface of said portable recording medium loaded in the way of being turned in the same direction as that of the recording surface of said portable recording medium loaded into said first loading tray, and
    an access unit disposed on the side of the recording surface to access the recording surface of said portable recording medium even in such a case that said portable recording medium is loaded into any one of said first loading tray and said second loading tray; and
    a processing circuit to issue, to said storage device, a command to execute at least any one of writing and reading data to and from said portable recording medium
    wherein the loading surface of the first loading tray and the loading surface of the second loading tray are different in their loading directions.

* * * * *